(12) United States Patent
Gienger

(10) Patent No.: US 8,509,951 B2
(45) Date of Patent: Aug. 13, 2013

(54) CONTROLLING THE TRAJECTORY OF AN EFFECTOR

(75) Inventor: Michael Gienger, Frankfurt am Main (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 1615 days.

(21) Appl. No.: 11/439,356

(22) Filed: May 22, 2006

(65) Prior Publication Data

US 2006/0293790 A1    Dec. 28, 2006

(30) Foreign Application Priority Data

May 31, 2005  (EP) .................................. 05011727

(51) Int. Cl.
*B25J 9/10*  (2006.01)
*B25J 9/16*  (2006.01)
*B25J 9/04*  (2006.01)
*B25J 9/06*  (2006.01)

(52) U.S. Cl.
USPC ................ 700/263; 700/245; 700/262; 901/2

(58) Field of Classification Search
USPC ........... 318/1, 568.1, 568.11, 568.12, 568.13, 318/568.25, 569; 700/1–7, 56–66, 245, 250–257, 262–263; 703/2, 11, 142, 150; 901/2
See application file for complete search history.

(56) References Cited

U.S. PATENT DOCUMENTS

| | | | |
|---|---|---|---|
| 4,694,229 A | 9/1987 | Cormack | |
| 4,852,018 A | 7/1989 | Grossberg et al. | |
| 5,083,073 A | 1/1992 | Kato | |
| 5,294,873 A | 3/1994 | Seraji et al. | |
| 5,579,444 A * | 11/1996 | Dalziel et al. | 700/259 |
| 6,301,396 B1 | 10/2001 | Michael et al. | |
| 6,317,651 B1 * | 11/2001 | Gerstenberger et al. | 700/245 |
| 6,687,402 B1 | 2/2004 | Taycher et al. | |
| 6,917,855 B2 | 7/2005 | Gonzalez-Banos et al. | |
| 2002/0099475 A1 | 7/2002 | Spangler et al. | |
| 2005/0234566 A1 | 10/2005 | Joublin et al. | |
| 2010/0280661 A1* | 11/2010 | Abdallah et al. | 700/260 |
| 2013/0079930 A1* | 3/2013 | Mistry | 700/261 |

OTHER PUBLICATIONS

Deng, L.; Janabi-Sharifi, F.; Wilson, W.J.; "Hybrid Motion Control and Planning Strategies for Visual Servoing," IEEE Transactions on Industrial Electronics, vol. 52, No. 4, pp. 1024-1040, Aug. 2005.*

(Continued)

*Primary Examiner* — Khoi Tran
*Assistant Examiner* — Dale Moyer
(74) *Attorney, Agent, or Firm* — Fenwick & West LLP

(57) ABSTRACT

The invention refers to a method for controlling the effector trajectory from a current state to a target state. First invariant control parameters of the trajectory are determined. The effector trajectory is then represented in a task description being void of the invariant control parameters. The effector trajectory is controlled on the basis of this task description. The invention further refers to a method for controlling the effector trajectory wherein the effector trajectory is calculated by mapping increments from a control parameter space on a configuration space. The dimensional difference between the configuration space and the control parameter space leaves redundant degrees of freedom of a Null space. The degrees of freedom of the Null space are increased using a task description being void of invariant control parameters. The invention further refers to a respective computer software program product, a manipulator, an actuated camera system, a robot comprising one or more manipulators and an automobile equipped with a driver support system.

13 Claims, 3 Drawing Sheets

(56) References Cited

OTHER PUBLICATIONS

Williams, R.L., III; "Local performance optimization for a class of redundant eight-degree-of-freedom manipulators," Proceedings of the 1994 IEEE International Conference on Robotics and Automation, pp. 992-997 vol. 2, May 8-13, 1994.*

European Search Report, EP 05011727, Mar. 22, 2006, 7 pages.

Buessler, J. et al., "Visually Guided Movements: Learning With Modular Neural Maps in Robotics," Neural Networks, 1998, pp. 1395-1415, vol. 11.

Cimponeriu, A. et al., "Intelligent Control With the Growing Competitive Linear Local Mapping Neural Network for Robotic Hand-Eye Coordination," 1998 Second International Conference on Knowledge-Based Intelligent Electronic Systems, Apr. 21-23, 1998, pp. 46-52.

Dean, P. et al., "Saccade Control in a Simulated Robot Camera-Head System: Neural Net Architectures for Efficient Learning of Inverse Kinematics," Biological Cybernetics, Nov. 1991, pp. 27-36, vol. 66, Springer-Verlag.

European Search Report, EP 04012356, Mar. 24, 2005, 4 pages.

European Search Report, EP 04012357, Mar. 17, 2005, 5 pages.

Kara, R. et al., "Robot Vision Tracking With a Hierarchical CMAC Controller," IEEE, 2000, pp. 271-274.

Kuhn, D. et al., "Cooperation of Neural Networks Applied to a Robotic Hand-Eye Coordination Task," IEEE, 1995, pp. 3694-3699.

Marjanovic, M. et al., "Self-Taught Visually-Guided Pointing for a Humanoid Robot," 10 pages.

Miller III, W. T., "Real-Time Application of Neural Networks for Sensor-Based Control of Robots With Vision," IEEE Transactions on Systems, Man, and Cypernetics, Jul./Aug. 1989, pp. 825-831, vol. 19, No. 4.

Miller III, W. T. et al., "CMAC: An Associative Neural Network Alternative to Backpropagation," IEEE, Oct. 1990, pp. 1561-1567, vol. 78, No. 10.

Miller, W.T. et al., "UNH_CMAC Version 2.1," The University of New Hampshire Implementation of the Cerebellar Model Arithmetic Computer—CMAC, University of New Hampshire, Aug. 31, 1994, pp. 1-19.

Pedreno, J.L. et al., "Neural Coordination Model for Perception Systems in an Anthropomorphic Robotic," Technical University of Cartagena, University of Paris Sud, 5 pages.

Pedreno-Molina, J. et al., "Trajectories Adaptive Prediction Based on Image Processing Cerebellar Model for Ocular-Motor Systems in Robotic Heads," IEEE, 2001, pp. 3008-3012.

Widrow, B. et al., "30 Years of Adaptive Neural Networks: Perceptron, Madaline, and Backpropagation," Proceedings of the IEEE, Sep. 1990, pp. 1415-1441, vol. 78, No. 9.

"Robotics," Wikipedia, the free encyclopedia, last modified Jan. 31, 2008, [online] [Retrieved on Jan. 31, 2008] Retrieved from the Internet<URL:http://en.wikipedia.org/wiki/Robotics>.

* cited by examiner

CONTROLLING THE TRAJECTORY OF AN EFFECTOR

RELATED APPLICATIONS

This application is related to U.S. patent application Ser. No. 11/102,283 filed on Apr. 8, 2005 and U.S. patent application Ser. No. 11/101,952 filed on Apr. 8, 2005 which are incorporated by reference herein in their entirety.

FIELD OF THE INVENTION

The invention relates generally to the field of robotics and more particularly to the control of an effector trajectory from a current state to a target state

BACKGROUND OF THE INVENTION

The present invention relates to the control of an effector trajectory from a current state to a target state and a respective computer software program, a manipulator, an actuated camera system, a robot comprising one or more manipulators or a vehicle equipped with a driver support system, for example.

When a trajectory of an effector, e.g., a robot, is controlled, the target state has to be defined. The target state is, for example, defined by an object that is to be handled by a manipulating arm of a robot. In general the position of the object can be described by three parameters. In addition to the object position it is necessary to describe a spatial orientation which is often made by Kardan- or Euler-angles.

To carry out the movement of an effector of a robot the trajectory is usually generated by mapping increments from a control parameter space on a configuration space.

The control parameter space or task space is the space of the command elements. The control parameter space is composed of the command elements. The command (also "target" or "task") elements are the elements of a respective command vector. These elements define a useful description of what should be controlled, e.g., the position of a hand or the inclination of a head. The configuration space is the space of controllable degrees of freedom. The configuration space can be composed of individual joints of a robot and/or more complex kinematics mechanisms to which controllable degrees of freedom can be assigned.

The mapping can be divided in following three different scenarios:

First, the configuration space dimension (or joint space dimension) corresponds to the control parameter space dimension (task space dimension). In such a case the mapping is mostly unique.

Second, the task space dimension exceeds the joint space dimension. In this case there will be generally no solution to the mapping, because an operation cannot be performed on the basis of the task space.

The third group represents the situation when the dimension of the joint space is higher than the dimension of the task space. This results in a so-called "Null space" representing the dimensional difference between the joint space and the task space. The Null space contains the redundant degrees of freedom, in which movements can be carried out without effecting the task space motion.

A mathematical definition of the Null space is: the set of arguments of a linear operator such that the corresponding function value is zero. Redundant systems have a (local) null space that can be used to address a secondary objective, such as kinematic conditioning, without disturbing a primary task.

Robots having a task leaving a Null space therefore are sometimes called "redundant robots", "kinematically redundant manipulators" etc. In the field of manipulators e.g., robotics, it is known to use the Null space in order to avoid obstacles, for example.

The problem with known generation methods of an effector trajectory is that it does not take into account that many problems have symmetric properties and therefore do not need a six parameter description of the object position and spatial orientation.

SUMMARY OF THE INVENTION

It is an object of the invention to simplify the manipulation of an effector and enable the application of additional control constraints.

The above-mentioned problem is solved by the methods for controlling the effector trajectory. Applying the present invention has effects in the real world which can be expressed in physical entities, e.g. the robustness of the control of a robot can be improved, its power consumption can be eventually made more efficient etc.

According to the invention the effector trajectory from a current state to a target state is controlled whereby invariant control parameters are taken into account. To this regard the invariant control parameters of the trajectory are determined. Invariant control parameters are control parameters that are not required, but do not interfere to achieve a given task. This can be the hand rotation about the symmetry axis of a cylindrical object, for example. The effector trajectory is then represented in a task description, the task description being void of the invariant control parameters. As the task description does not contain the invariant control parameters the dimension of the Null space is increased. The advantage of an increased dimension of the Null space is that the redundancies also increase. This allows applying redundant control techniques or other additional control criteria. The effector trajectory is controlled on the basis of the task description that is void of the invariant control parameters.

According to another aspect of the invention the effector trajectory is calculated by mapping increments from a control parameter space on a configuration space. The degrees of freedom of the Null space that result from a dimensional difference between a configuration space and a control parameter space is increased. Therefore the invariant control parameters of the trajectory are determined. The increase of the degrees of freedom of the Null space is based on the usage of a task description being void of the invariant control parameters.

As it is already explained such an increase in the degrees of freedom of the Null space result in the possibility of applying redundant control techniques or additional control criteria. Thus it is necessary to determine the invariant control parameters and then represent the effector trajectory in a task description whereby the task description is reduced in dimension by being void of the invariant control parameters.

The features and advantages described in the specification are not all inclusive, and particularly, many additional features and advantages will be apparent to one of ordinary skill in the art in view of the drawings, specification and claims herein. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE INVENTION

Figure 1:
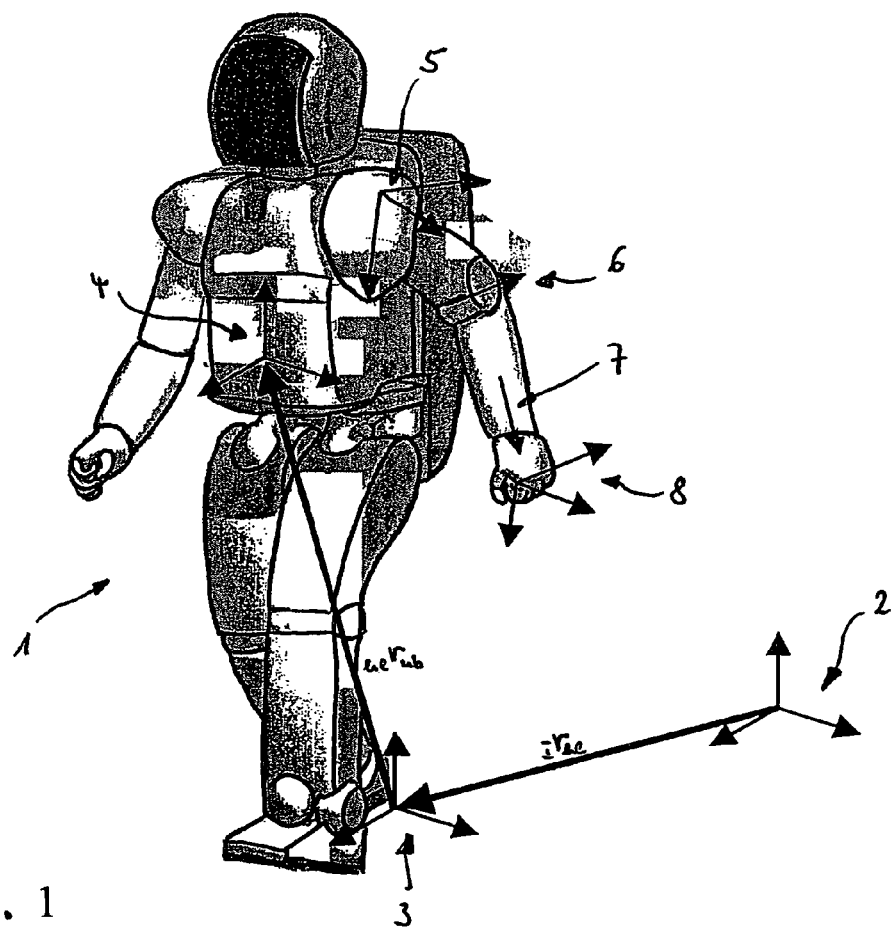
FIG. 1 a kinematic model of a robot.

A preferred embodiment of the present invention is now described with reference to the figures where like reference numbers indicate identical or functionally similar elements. Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

At first a kinematic model of a humanoid robot 1 shown in FIG. 1 shall be explained. Note that the invention can equally find application for other robots, automated manipulation devices or vehicles.

The current state of the robot 1 is defined by a state vector q that consists of coordinates representing 21 degrees of freedom in a configuration space. The state vector comprises the configuration space elements. The basis for deriving the state vector q is an inertial, world-fixed coordinate frame 2. The position of the robot 1 with respect to the inertial frame 2 is described by defining the position and rotation of a heel coordinate system 3 with respect to the inertial frame 2. The position and orientation of the heel frame 3 is represented by a vector with 3 coordinates. The coordinates describe a translation in the x- and y-direction and a rotation about the vertical axis of the inertial frame 2.

Next the upper body has to be described with respect to the position and orientation of the heel frame 3. The position and orientation of an upper body frame 4 is defined with respect to the heel frame 3. The position is described by three position coordinates and the spatial orientation is described by three angles representing rotations with respect to the heel frame 3. The posture of the robot arm is described by five angles. Three of the angles represent the shoulder 5, the elbow is represented by a fourth angle and finally the wrist is represented by a fifth angle of the arm. Each angle describes the relation between the links that are connected via the respective joint.

Taking into account that the right arm of the robot 1 comprises five joints as well and that the head has another two degrees of freedom for the head pan and tilt the 21 degrees of freedom of the state vector q are explained.

To move the robot 1 it is necessary to change values of the single coordinates. This is performed by a task or command vector. Using direct kinematics the task or command vector is computed on the basis of the state vector q as per equation (1).

$$x = f(q) \tag{1}$$

As the position and orientation of the single frames 3, 5, 8 that describe robot 1 are step-by-step developed from inertial frame 2 because of the tree-like structure of robot 1, the computation of the command vector x can be done recursively.

Furthermore the computation can be divided up into two separate steps. The first step is the computation of the frame rotation. In order to compute the orientation of a specific frame with respect to a basis, for example the upper body frame 4 with respect to the heel frame 3, three segment rotation matrixes $A_x$, $A_y$ and $A_z$, are used. These rotation matrixes are used to describe the relative rotations about positive x-, y- and z-axis. As it has been stated earlier the heel frame 3 is rotated only about the vertical axis. Thus the rotation matrix for the heel frame 3 is defined by equation (2).

$$A_{hl\text{-}I} = A_z(\phi_{z,hl}) A_I = A_z(\phi_{z,hl}) \tag{2}$$

Where $A_I = E$; E being the unity matrix for the inertial frame. The indices of the rotation matrix $A_{hl\text{-}I}$ denote a rotation from the system I (inertial frame) into the system hl (heel frame 3). The initial coordinate frame is a reference coordinate system that is not accelerated. In robotics terminology, it is also often called "World coordinate frame". Due to the kinematic model shown in FIG. 1 the upper body frame 4 can be rotated with respect to all three of the axes x, y, z. Thus the rotation matrix for the upper body is as follows in equation (3).

$$A_{ub\text{-}I} = A_z(\phi_{z,ub}) A_y(\phi_{y,ub}) A_x(\phi_{x,ub}) A_{hl\text{-}I} \tag{3}$$

In the same way the rotation matrices of the frame built by the three shoulder joints 5 and the head pan and tilt joints can be computed.

In addition to the rotation matrices it is necessary to compute the coordinate frame origins. Analogue to the computation of the rotation matrices the origin vectors of the coordinate frame can be computed starting with the origin vector $_I r_{hl}$ of the heel frame 3 in coordinates of the inertial frame 2. Thus the origin vector $_I r_{hl}$ of the heel frame 3 in the inertial frame 2 (I) is shown in equation (4).

$$_I r_{hl} = (x_{hl} y_{hl} 0)^T \tag{4}$$

In the inertial position of the robot 1 the origin of the upper body frame 4 goes through a rotation about the z-axis and thus the origin vector $_I r_{ub}$ of the upper body frame 4 in coordinates of the inertial frame is shown in equation (5).

$$_I r_{ub} = {_I r_{hl}} + A^T_z(\phi_{z,hl}) {_{hl} r_{ub}} \tag{5}$$

The origin vectors of the other frames are computed respectively. The current state of robot 1 thus is described by a state vector q in coordinates of the inertial frame 2.

The rotation matrixes and the origin vectors of the frames in coordinates of the inertial frame 2 build the basis for forward kinematics computation and for setting up the inverse kinematics equations.

Figure 2:
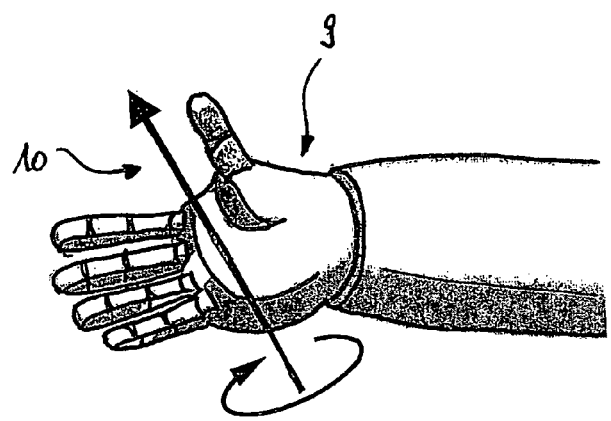
FIG. 2 an illustration of a first symmetry aspect to be considered.

In FIG. 2 a typical task for a humanoid robot 1 is illustrated. The problem is for example to bring an end effector of the robot 1 into a target state. In FIG. 2 this is illustrated by the use of a hand 9 that shall grasp an object. Many objects are of a cylindrical shape. Thus a rotation of a hand about the symmetry axis of the cylindrical object is irrelevant for grasping such a cylindrical object. Such objects can be cylindrical glasses for example. The arrow 10 represents a grasp axis of a hand. The task is to bring the hand 9 in a position that enables grasping the glass which is equivalent to a rotation of the hand until the grasp axis 10 of the hand 9 coincides with the symmetry axis of the cylindrical abject. Because of the rotational symmetry of the object a rotation of the hand 9 about its grasp axis 10 does not affect the grasping process. The position of the left hand of the robot 1 in terms of the heel frame 3 is represented by equation (6).

$$_{hl} r_{ht,i} = A_{hl\text{-}II} r_{ht,I} \tag{6}$$

Index "i" denotes the left or right hand and index "ht" denotes the hand reference point.

Usually the attitude of the hand 9 (i.e. the spatial orientation of the hand 9) is described by Kardan- or Euler-angles. The attitude of the hand 9 can be derived by the respective hand rotation matrix in terms of the Kardan angles α (about the x-axis), β (about the rotated y-axis) and γ (about the rotated z-axis) with respect to the inertial frame 2. The corresponding rotation matrix is shown in equation (7).

$$A_{K1} = \begin{pmatrix} c\beta c\gamma & c\alpha s\gamma + s\alpha s\beta c\gamma & s\alpha s\gamma - c\alpha s\beta c\gamma \\ -c\beta s\gamma & c\alpha c\gamma - s\alpha s\beta s\gamma & s\alpha c\gamma + c\alpha s\beta s\gamma \\ s\beta & -s\alpha c\beta & c\alpha c\beta \end{pmatrix} \tag{7}$$

Where cos ( . . . ) and sin ( . . . ) are abbreviated c ( . . . ) and s ( . . . ). Starting from the rotation matrix $A_{KI}$ the Kardan angles α, β and γ can be derived. In this 3-D-description the attitude of the hand 9 is "locked" which means the orientation of the hand grasp axis 10 is fixed. This includes a rotation of the hand 9 about the symmetry axis of the object, represented by the arrow 10. The rotation angle of the hand 9 about its grasp axis 10 is described although it is not necessary. Thus, it is advantageous to represent the hand attitude with less than three degrees of freedom. Describing the hand attitude with less than three degrees of freedom enhances the Null space dimension. According to the invention a task description for describing the attitude of the hand 9 and thus the effected trajectory is used. The task space is reduced in dimension by using symmetry aspects and by determining the invariant control parameters. The trajectory is described only by a task vector of elements that are essential for the problem to be solved. The task (or command) vector comprises the control parameters. The effector trajectory thus is represented in the task space. This task description is being void of the invariant control parameters and will be described with respect to FIG. 3.

Figure 3:
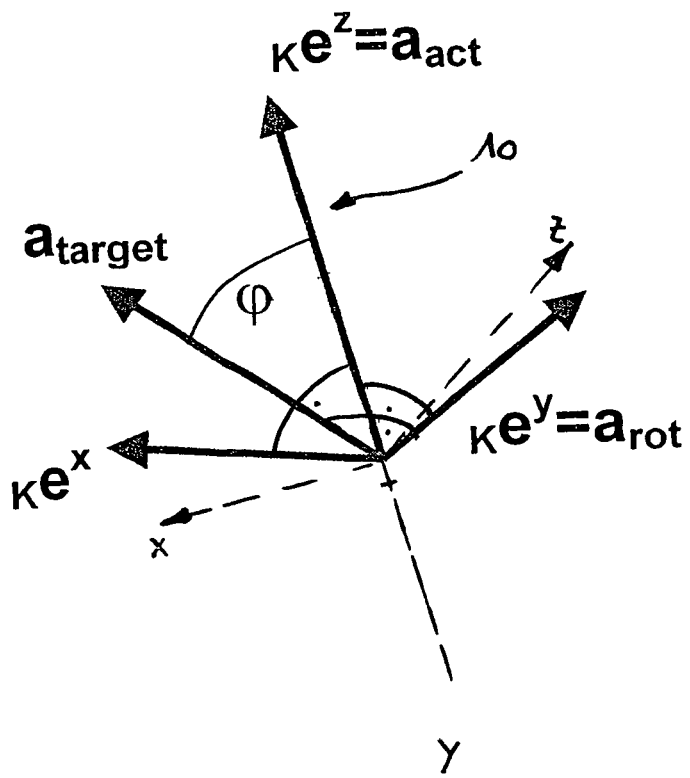
FIG. 3 an illustration of the task description with respect to the first symmetry aspect of FIG. 2.

In FIG. 3 the actual grasp axis of the hand 9 that corresponds to the arrow 10 in FIG. 2 is represented by a vector $a_{act}$. The symmetry axis of an object to be grasped is represented by a target vector $a_{target}$ that represents the target state. The target state is a set of control parameters that defines the target of the effectors. The movement that has to be performed by the hand 9 corresponds to a rotation of the grasp axis $a_{act}$ by an angle φ. The angle φ is the angle between the current grasp axis $a_{act}$ and the target vector $a_{target}$. The grasp axis $a_{act}$ and the target vector $a_{target}$ define a plane in which the two dimensional rotation of the grasp vector $a_{act}$ is performed. The current state grasp axis $a_{act}$ is the current state of the effector, in the illustrated example the hand 9 of a robot 1.

The rotation of the grasp axis $a_{act}$ can be described by a rotation about a rotating axis $a_{rot}$. This rotation axis $a_{rot}$ is perpendicular to the plane that is defined by the current grasp axis $a_{act}$ and the target vector $a_{target}$. As no further rotation is necessary to bring the grasp axis into a position that coincides with the target vector $a_{target}$ the rotation about a vector $_k e^x$ perpendicular to $a_{act}$ and $a_{rot}$ is zero. Thus, there are only two control commands necessary that build the components of a task vector $x_{2d} = (\phi 0)^T$. The 2-D-task vector is based on a task description that is void of the invariant control parameters. Thus a task frame is established, defined by orthogonal unity vectors $_ke^x$, $_ke^y$ and $_ke^z$. The unity vector $_ke^z$ coincides with the symmetry axis of the effector. In this case the symmetry axis is the grasp axis 10.

The trajectory of the hand 9 is calculated now by mapping increments $\delta x_{2d}$ of the task vector $x_{2d}$ on the joint angles. This can be described by equation (8).

$$\delta q = J_{2d\text{-}act}^{\#}(d\varphi 0)^T \tag{8}$$

$J_{2d\text{-}act}^{\#}$ is a pseudo inverse of the 2-D-Jacobian.

In order to compute the increments of the control parameters first the rotation angle between the actual grasp axis $a_{act}$ and the target vector $a_{target}$ has to be computed. The angle $\varphi$ is set forth as described in equation (9).

$$\varphi = \arccos\left(\frac{I^{e_{sl}^z} \cdot I^{a_{cmd}}}{|I^{e_{sl}^z}||I^{a_{cmd}}|}\right) \tag{9}$$

The unity vectors $_ke^x$, $_ke^y$ and $_ke^z$ define a frame that is used for the task description and in the following denoted with index "sl". As the rotation matrix of the inertial frame 2 into the hand tip frame 8 has already been computed, the rotation matrix from the sl-frame into the hand frame 8 can be computed as described in equation (10).

$$A_{ht\text{-}sl} = A_{ht\text{-}I} A_{I\text{-}sl} \tag{10}$$

The required angular velocity can be written as a first order low pass filter to converge to the command axis (time constant T) as shown in equation (11).

$$_{sl}\omega = \begin{pmatrix} 0 \\ -\dfrac{\varphi}{T} \\ 0 \end{pmatrix} \tag{11}$$

With the known angular velocity $_{sl}\omega$ that rotates the grasp axis around the axis $a_{rot}$, the required hand fixed angular velocities can be computed. That means on the basis of the rotation matrix $A_{ht\text{-}sl}$ the increments of the hand-fixed angles in x and z direction can be computed as per equation (12).

$$_{ht}\omega = A_{ht\text{-}sl\,sl}\omega \tag{12}$$

Figure 4:
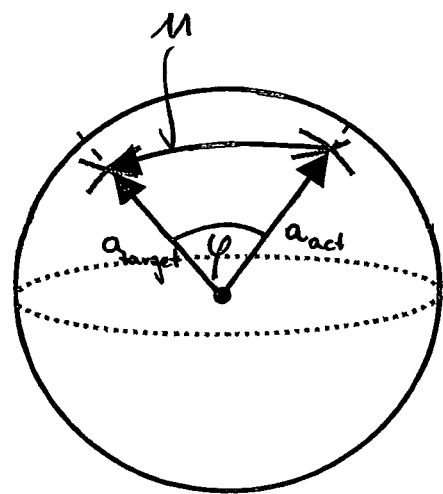
FIG. 4 an illustration of a trajectory generated on a circle of a sphere.

The index "ht" denotes the hand-fixed coordinate system. The rotation of the actual grasp axis $a_{act}$ about the rotation axis $a_{rot}$ results in a path as shortest connection on the surface of a sphere. This shortest connection 11 is the effector trajectory and illustrated with FIG. 4. This shortest connection on a surface of a sphere is described by the arrow head of the actual grasp axis $a_{act}$ by being rotated by an angle $\varphi$ into the position of the target vector $a_{target}$.

Besides the above-mentioned control of the trajectory by computing the path as the shortest connection on the surface on a sphere there are several other trajectory generation methods possible. E.g. computing the path between the vector end points by a linear interpolation or use biologically inspired methods (Minimum Jerk Model).

The invention is also not limited to a specific determination method of velocity an acceleration profiles. These can be determined by a velocity ramp filter, higher order low pass filters of $5^{th}$ or higher order polynomials.

Another example of such a rotational symmetry that can be used to determine invariant control parameters of the trajectory is the axis of a camera. In most cases a rotation about the view axis of the camera is irrelevant. The view axis of the camera is the optical axis of the camera. Thus the operation of the camera corresponds to the above-described grasping operation of the robot's hand 9.

This is in particular evident if the camera shall focus on an object that the robot 1 shall reach. As long as the view axis of the camera is aligned with a connection line of the current position of the camera and the target position it does not matter if the camera is rotated about its symmetry axis during the approach of the target position. This means that the trajectory is invariant with respect to a rotation of the camera about its view axis. As it has been described in detail for a symmetry of the target state it is also possible for the trajectory being invariant to a rotation of an effector about its symmetry axis for example to determine invariant control parameters. This again increases the dimension of the Null space again.

In general the mapping on the configuration space can be separated into a mapping of the task space being void of the invariant dimensions and a mapping of the Null space. This separation of the mapping can be formulated as shown in equation (13).

$$\delta q = J^{\#}\delta x_{cmd} + N\xi \tag{13}$$

For this separation N is a linear matrix that maps joint angle increments $\xi$ into the Null space. The mapping matrix N can be computed as shown in equation (14).

$$N = E - J^{\#}J. \tag{14}$$

The Null space motion is orthogonal to the task space motion and can be employed to optimize additional criteria (power consumption, robustness of the control, . . . ). Particular examples for such additional criteria in the field of robotics can be used for example to avoid joint limits, to avoid singular configurations or to avoid obstacles. It is possible not only to apply one optimization criterion but to superimpose different optimization criteria.

The method for controlling a trajectory is for example programmed in a manipulator or a camera system. The camera system is actuated so that the camera symmetry axis can be oriented in any direction. Such a camera system can be installed in a car as a driver support system.

Furthermore it is useful to program a manipulator in such a way that the method is carried out. More than one such manipulator can be incorporated in a robot which is additionally equipped with an actuated camera system. The actuated camera system is for example integrated in a head of a robot 1. The increased dimension of the Null space can then be used to apply additional criteria for an improved movement.

Figure 5:
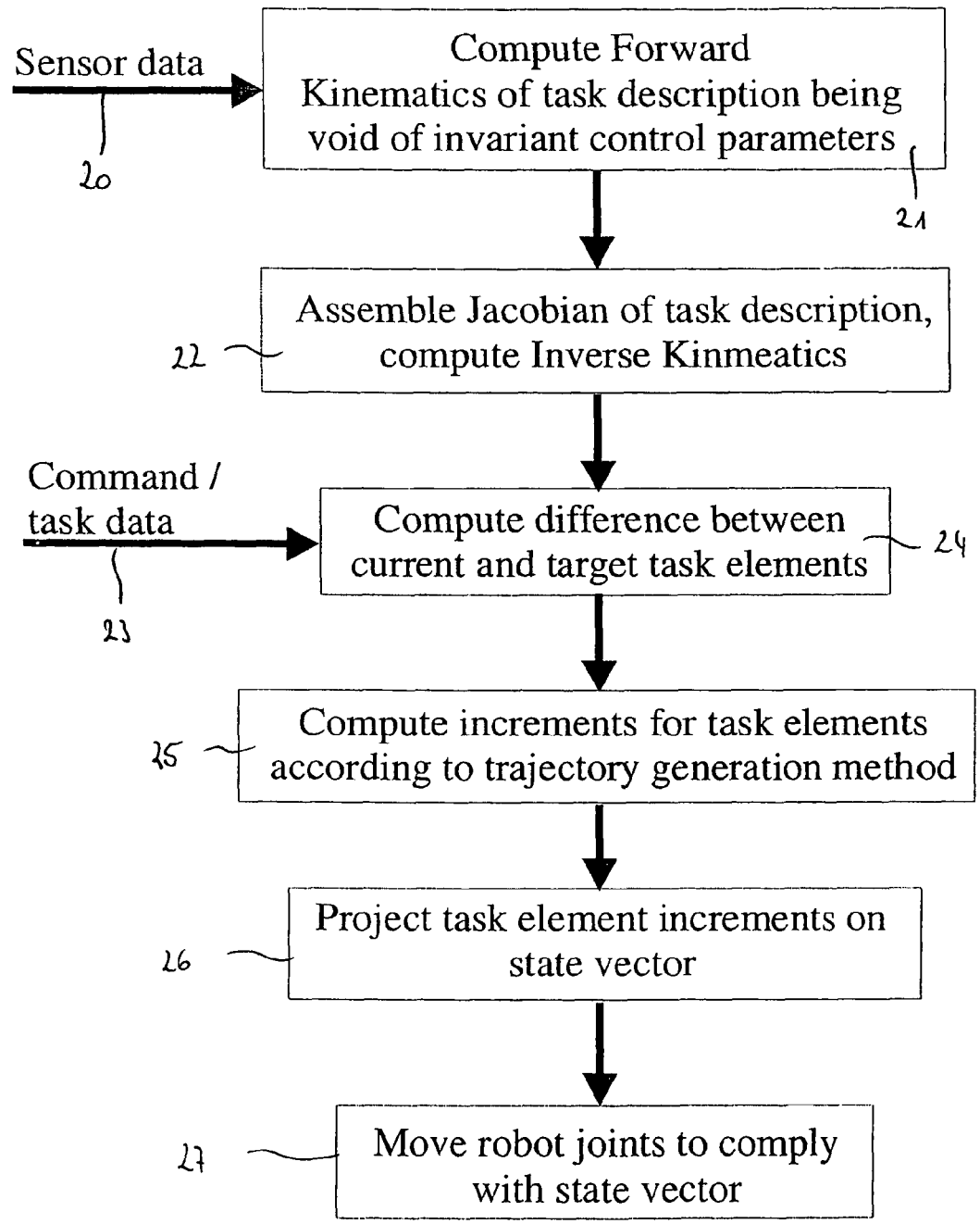
FIG. 5 a block diagram of a method for controlling the trajectory of an effector.

The general procedure for controlling the trajectory of an effector is illustrated with the block diagram of FIG. 5. On the basis of sensor data (20) the forward kinematics of a task description is computed whereby the task description is being void of invariant control parameters (21). Starting from the computed forward kinematics of step 21 in a next step 22 the Jacobian of task description is assembled and the inverse kinematics are computed.

Then, in step 24, the difference between the current state and the target state is computed. In order to compute the difference between the current state and the target state command or task data has to be defined. The definition of the command or task data can be made for example on the basis of a position and orientation of an object that is to be handled.

With the knowledge of the difference between the current state and the target state in step 25, the increments of the elements of the task vector are computed according to the trajectory generation method previously described. The increments of the elements of the task vector are then projected on a state vector (step 26). In a final step 27 the robot joints are moved accordingly in order to bring the effector into the desired position.

It is apparent that the scope of the invention is not limited by the described embodiment.

What is claimed is:

1. A method for controlling a trajectory of an effector from a current state to a target state, the method comprising the steps of:
    increasing degrees of freedom in Null space by representing the effector trajectory in a task description disregarding rotation of the effector about a symmetry axis of a target object;
    applying, by a processor, additional control criteria to control the trajectory based on the increased degrees of freedom in Null space; and
    controlling the effector trajectory on the basis of the task description and the additional control criteria to reach the target state.

2. The method of claim 1, wherein the task description is based on an orthogonal coordinate frame that is defined by a current effector axis and a symmetry axis of the target state.

3. The method of claim 2, wherein the effector comprises an effector axis around which the effector is rotated into the target state.

4. The method of claim 3, wherein the rotation of the effector axis is described by a two dimensional task vector.

5. The method of claim 1, wherein the effector comprises an effector axis around which the effector is rotated into the target state.

6. The method of claim 1, wherein the effector is symmetric with respect to a symmetry axis that coincides with the trajectory.

7. The method of claim 1, wherein the effector comprises a robot.

8. A non-transitory computer readable medium storing instructions when executed by a processor, perform a method comprising:
    increasing degrees of freedom in Null space by representing an effector trajectory using a task description disregarding rotation of an effector about a symmetry axis of a target object;
    applying additional control criteria to control the effector trajectory based on the increased degrees of freedom in Null space; and
    controlling the effector trajectory based on the task description and the additional control criteria to reach to a target state from a current state.

9. An actuated camera system comprising:
    a non-transitory computer readable storage medium for storing instructions, when executed by a processor, perform a method comprising:
        increasing degrees of freedom in Null space by representing the effector trajectory in a task description disregarding rotation of the effector about a symmetry axis of a target object,
        applying additional control criteria to control the trajectory based on the increased degrees of freedom in Null space, and
        controlling the effector trajectory based on the task description and the additional control criteria to reach a target state from a current state; and
    a camera controlled by the processor.

10. A method for controlling a trajectory of an effector from a current state to a target state, the effector trajectory calculated by mapping increments from a control parameter space on the configuration space; a dimensional difference between the configuration space and the control parameter space leaving redundant degrees of freedom of a Null space, the method comprising:
    increasing degrees of freedom of the Null space of trajectory control by using a task description disregarding rotation of the effector about a symmetry axis of a target object; and
    applying, by a processor, additional control criteria to control the trajectory based on the increased degrees of freedom in Null space.

11. The method of claim 10, wherein the target state is associated with the symmetry axis.

12. The method of claim 10, wherein the effector comprises a robot.

13. A non-transitory computer readable medium storing instructions for controlling a trajectory of an effector from a current state to a target state, the effector trajectory calculated by mapping increments from a control parameter space on the configuration space; a dimensional difference between the configuration space and the control parameter space leaving redundant degrees of freedom of a Null space, the instructions when executed by a processor performing a method comprising: increasing degrees of freedom of Null space of an effector trajectory by using a task description disregarding rotation of the effector about a symmetry axis of a target object; and
    applying additional control criteria to control the trajectory based on the increased degrees of freedom in Null space.

* * * * *